(12) United States Patent
van Rensburg et al.

(10) Patent No.: US 11,196,579 B2
(45) Date of Patent: *Dec. 7, 2021

(54) SYSTEM AND METHOD FOR DETERMINING A SOURCE AND TOPIC OF CONTENT FOR POSTING IN A CHAT GROUP

(71) Applicant: RingCentral, Inc., Belmont, CA (US)

(72) Inventors: Christopher van Rensburg, Portland, OR (US); Vlad Vendrow, Reno, NV (US)

(73) Assignee: RingCentral, Irse., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,094

(22) Filed: Sep. 21, 2020

(65) Prior Publication Data

US 2021/0306174 A1     Sep. 30, 2021

Related U.S. Application Data

(63) Continuation of application No. 16/833,007, filed on Mar. 27, 2020, now Pat. No. 10,819,532.

(51) Int. Cl.
*H04L 12/18*     (2006.01)
*G06F 40/30*     (2020.01)
*H04L 12/58*     (2006.01)

(52) U.S. Cl.
CPC .......... *H04L 12/1831* (2013.01); *G06F 40/30* (2020.01); *H04L 51/02* (2013.01); *H04L 51/046* (2013.01); *H04L 51/16* (2013.01); *H04L 51/32* (2013.01)

(58) Field of Classification Search
CPC ...................................................... H04L 12/18
See application file for complete search history.

(56) References Cited

U.S. PATENT DOCUMENTS

| | | | |
|---|---|---|---|
| 8,914,452 B2 | 12/2014 | Boston et al. | |
| 9,245,254 B2 | 1/2016 | Lord et al. | |
| 10,819,532 B1 * | 10/2020 | van Rensburg | H04L 51/046 |
| 2003/0191760 A1 * | 10/2003 | Cameron | G06Q 30/02 |
| 2005/0108001 A1 * | 5/2005 | Aarskog | G06F 40/289 |
| | | | 704/10 |
| 2007/0162272 A1 * | 7/2007 | Koshinaka | G06F 40/30 |
| | | | 704/9 |
| 2011/0010182 A1 | 1/2011 | Turski et al. | |
| 2014/0310329 A1 * | 10/2014 | Jones | G06Q 10/00 |
| | | | 709/201 |
| 2016/0042298 A1 * | 2/2016 | Liang | G06F 16/337 |
| | | | 706/12 |
| 2019/0007228 A1 | 1/2019 | Vuskovic et al. | |

* cited by examiner

*Primary Examiner* — Nicholas P Celani
(74) *Attorney, Agent, or Firm* — Finnegan, Henderson, Farabow, Garrett & Dunner LLP

(57) ABSTRACT

A system for determining a source and topic of content for posting in a chat group is disclosed. The system includes a memory and at least one processor. The at least one processor may be configured to perform operations including identifying a user as a source of content; identifying a topic from the content using a language analysis application; determining, from the identified topic, a particular chat group from among a set of chat groups; and posting a portion of the content as a new message from the user in a message thread for the particular chat group.

20 Claims, 9 Drawing Sheets

SYSTEM AND METHOD FOR DETERMINING A SOURCE AND TOPIC OF CONTENT FOR POSTING IN A CHAT GROUP

CROSS-REFERENCE TO RELATED APPLICATION

This application is a continuation application of, and claims the benefit of priority to U.S. patent application Ser. No. 16/833,007, filed on Mar. 27, 2020, the entire contents of which are incorporated herein by reference.

TECHNICAL FIELD

The present disclosure relates to the field of conferencing systems and, more particularly, systems and methods for determining a source and topic of content for posting in a chat group.

BACKGROUND

Presentations are often delivered to audiences that do not include all interested personnel due to room seating constraints and personnel availability. Important information provided during presentations may not be disseminated to all interested persons, resulting in inefficiencies and errors in an organization's operations. Generally, to overcome this, organizations employ video or telephone conferencing capabilities, allowing virtually unlimited audience size. Additionally, presentations may be recorded to allow asynchronous viewing of presentations.

However, multiple topics may be covered in a presentation, and only a subset of the topics presented may interest a particular individual or group. For instance, a cybersecurity office within an organization may desire to learn about a company's recent cybersecurity priorities, but the office may not have interest in the organization's new employee recruiting efforts. Further, members of the cybersecurity office may not have sufficient time to listen to a long presentation to hear a short relevant section. This reduces attendance, either in-person or by video or teleconference capabilities, as well as consumption of recorded presentations and discussions. Thus, content length may impede wide dissemination of policies, decisions, priorities, and guidance which could affect company operations. Similarly, large documents may attract limited readers due to a low amount of information relevant to the reader mixed with large amounts of irrelevant information.

To remedy this, organizations often employ meeting minutes to provide summaries of discussed topics, and disseminate the meeting minutes to interested parties. This solution, though, introduces additional problems. Meeting minutes may be inaccurate, record topics discussed generally while missing important details, and may not identify the speaker of the information. Meeting minutes also are often delayed and require time and effort to produce, increasing costs and preventing prompt access to information. Dissemination of meeting minutes may be problematic as well. For instance, if an organization has information that must remain secure by limiting distribution, disseminating meeting minutes may require labor-intensive parsing of information to ensure that offices only receive information they have permission or desire to view. This further increases costs, and risks accidental dissemination of sensitive information or misaddressed information. Often, rather than broadly disseminating information, organizations prefer to restrict dissemination altogether, preventing collaboration and reducing efficiency. Alternatively, organizations broadly disseminate information, causing information overload in organization members and causing members to ignore information.

SUMMARY

In one disclosed embodiment, an automated transcription system is disclosed. The system includes a memory and at least one processor. The at least one processor is configured to perform operations including identifying a user as a source of content; identifying a topic from the content using a language analysis application; determining, from the identified topic, a particular chat group from among a set of chat groups; and posting a portion of the content as a new message from the user in a message thread for the particular chat group.

In another disclosed embodiment, a computer-implemented automated transcription insertion method includes identifying a user as a source of content; identifying a topic from the content using a language analysis application; determining, from the identified topic, a particular chat group from among a set of chat groups; and posting a portion of the content as a new message from the user in a message thread for the particular chat group.

In another disclosed embodiment, a non-transitory computer readable medium is disclosed. The non-transitory computer readable medium stores a set of instructions that is executable by at least one processor to perform operations including identifying a user as a source of content; identifying a topic from the content using a language analysis application; determining, from the identified topic, a particular chat group from among a set of chat groups; and posting a portion of the content as a new message from the user in a message thread for the particular chat group.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
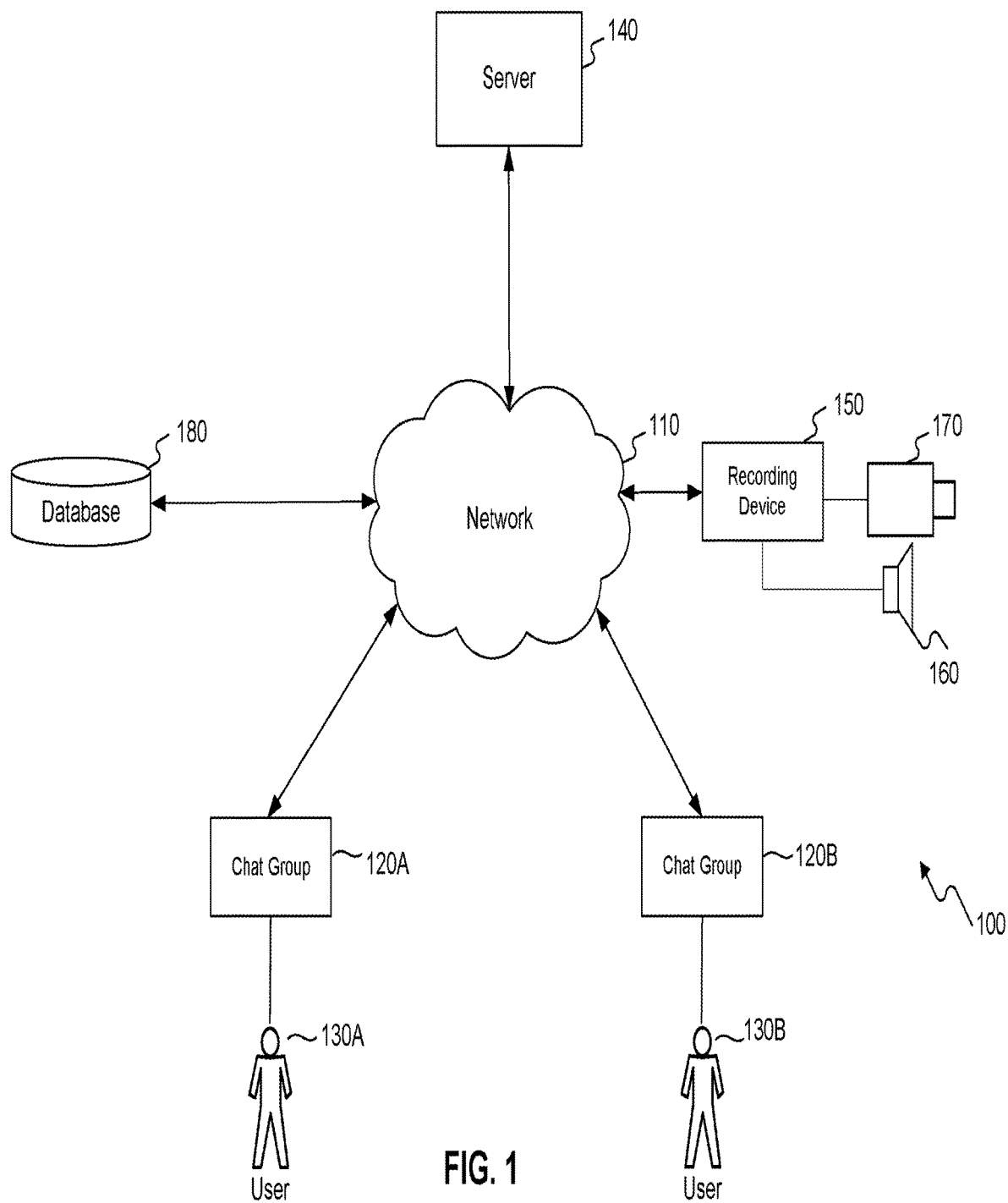
FIG. 1 is a diagram of an example system in which various implementations described herein may be practiced.

Reference will now be made in detail to example embodiments implemented according to the present disclosure and illustrated in the accompanying drawings. Wherever possible, the same reference numbers will be used throughout the drawings to refer to the same or like parts.

The present disclosure arises from the realization that an organization may improve productivity and distribution of information by combining conferencing, presentation, and file management technology with chat groups. For example, an author of a document, presenter delivering a presentation, or speaker during a teleconference or videoconference may be unable to quickly direct relevant excerpts to an interested chat group to precisely distribute content to interested parties. However, precise distribution may be helpful to ensure that interested parties are not overwhelmed by unnecessary or irrelevant information. Additionally, members of the chat group may consider information more relevant if they know the identity of the speaker. Thus, presenting messages in a chat group that appear to originate from an author or speaker may increase visibility of a message and improve communication. Further, messages in a chat group may indicate to members of the chat group that a linked content contains more information that may be interesting and relevant to members of the chat group, further helping organizations to improve communication and standardizing a knowledge base between members of a chat group. In the present disclosure, "chat group" refers to an application allowing users to post messages that are viewable by all members with permission. The application may display messages in the chat group in chronological order, such that most recent messages are displayed prominently while historical messages are recorded and displayed when a user scrolls. Further, as used herein, "transcription" refers to textual content, such as text corresponding to words spoken during a presentation, conversation, meeting, and the like, as well as text contained in a written document, such as slides, files, spreadsheets, diagrams, flowcharts, and the like.

Disclosed embodiments further identify a topic of content and determine a chat group for which the topic is relevant. In some embodiments, a message is posted to a chat group with a link to view a live presentation, thus letting non-participants know that an ongoing presentation may be interesting to them, and giving them the opportunity to view the presentation as it progresses. Disclosed embodiments may enable members of a chat group to provide feedback. Additionally, disclosed embodiments may be capable of processing textual, audio, and visual media to identify relevant content and speakers for posting messages to related chat groups.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such as a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 is a diagram of an example system 100 in which various implementations described herein may be practiced. System 100 enables a presenter to, for example, deliver a presentation, while a server 140 creates a transcription of the presentation and posts messages into a chat group 120A, 120B viewable by users 130A, 130B, depending on interests, focuses, and permissions, using a network 110. The components and arrangements shown in FIG. 1 are not intended to limit the disclosed embodiments, as the system components used to implement the disclosed processes and features can vary.

Further, system 100 may include a recording device 150, further including a microphone 160 and/or a video camera 170. Recording device 150 may send recorded content through network 110 to server 140, or may be integrated into server 140. In some embodiments, a user may upload other files to server 140, such as a document, video file, or audio file, or provide a link to a file hosted on a server, accessible through a web page retrieved via network 110.

Network 110 facilitates communications and sharing of content between components of system 100. Network 110 may be any type of network that provides communications, exchanges information, and/or facilitates the exchange of information between server 140, recording device 150, a database 180, and chat groups 120A, 120B. For example, network 110 may be the Internet, a Local Area Network (LAN), a cellular network, a public switched telephone network (PSTN), or other suitable connection(s) that enables system 100 to send and receive information between components. Network 110 may support a variety of electronic messaging formats, and may further support a variety of services and applications.

In some embodiments, one or more components of system 100 may implement computer programs, applications, methods, processes, or other software to perform the described techniques and to realize the structures described herein. For example, server 100 may host an intranet corresponding to network 110. Additionally, components of system 100 may be combined in the same hardware. For instance, server 140 may access a cloud database by connecting to network 110.

Server 140 may be a computer-based system including computer system components, desktop computers, workstations, tablets, hand held computing devices, memory devices, and/or internal network(s) connecting the components. Server 140 may be configured to provide conference services, such as hosting videoconference or teleconferences. Server 140 may be configured to receive information from users over network 110, process the information, store the information, and/or transmit information to users over network 110. For example, server 140 may be configured to extract an audio component from a video recording, identify one or more topics discussed in the audio file, and identify a chat group 120A, 120B focusing on the identified topic(s). The recording may be created automatically and saved on server 140 upon activation of recording device 150. Additionally, server 140 may receive a recording as a file uploaded by a user, and process the file to identify topics and chat groups. Identification of topics may be performed by analyzing a transcript of the recording. The transcript may be created in real-time, or may be created after a recording has completed. In some embodiments, server 140 may use network 110 to connect to another server (not shown) configured to create a transcription.

Database 180 may include one or more physical or virtual storages coupled with server 140. Database 180 may be configured to store agendas, presentations, audio and/or video files, chat history, or training data for use by server 140. For example, database 180 may store associations of topics, keywords, and chat groups used by server 140 to identify a topic of a conversation in a document, audio, or video. Database 180 may also store chat group identifiers, chat group permission lists, contact information of users 130A, 1306, and/or images of faces and voice identification files. In some embodiments, database 180 is stored in a cloud-based server (not shown) that is accessible by server 140 through network 110. While database 180 is illustrated as an external device connected to server 140, database 180 may also reside within server 140 as an internal component of server 140.

As shown in FIG. 1, users 130A, 1306 communicate with server 140 via network 110. As an example, users 130A, 1306 may view chat groups with devices such as a television, tablet, computer monitor, video conferencing console, or laptop computer screen. The devices may also include video/audio input devices such as a video camera, web camera, microphone, or the like. As another example, devices may include mobile devices such as a tablet or a smartphone, video or audio conferencing consoles, having display and video/audio capture capabilities. The devices may also include one or more software applications that facilitate users 130A, 1306 to engage in communications, such as instant messaging, text messaging, email, telephony, video conferencing, or the like.

Figure 2:
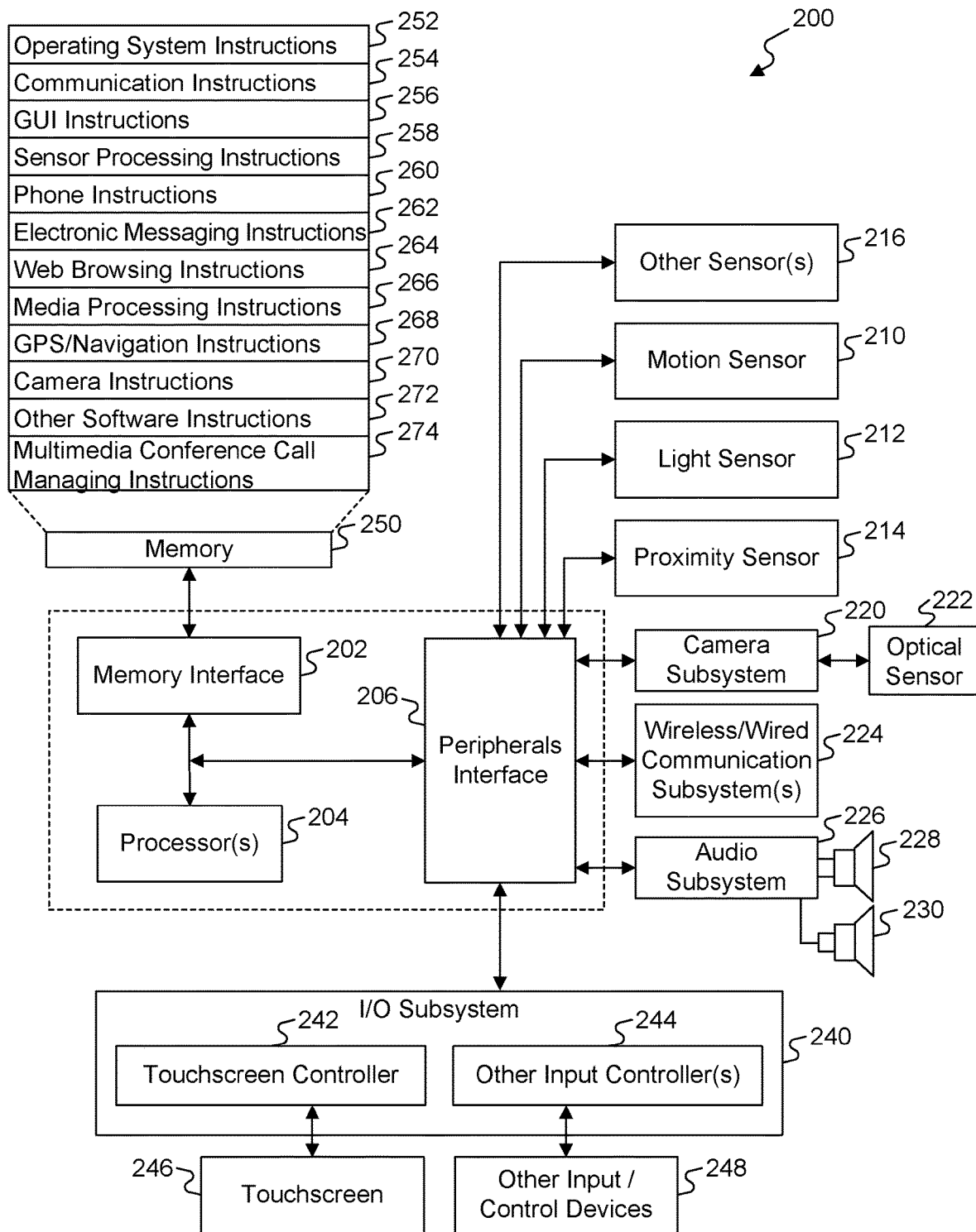
FIG. 2 is a diagram of a recording device for implementing embodiments consistent with the present disclosure.

FIG. 2 is a diagram of an example of a recording device 200 for use in system 100. Recording device 200 can be used to implement computer programs, applications, methods, processes, or other software to perform embodiments described in the present disclosure. Recording device 200 includes a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in device 200 can be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 can be coupled to peripherals interface 206 to facilitate orientation, lighting, and proximity functions. Other sensors 216 can also be connected to peripherals interface 206, such as a positioning system (e.g., GPS receiver), a temperature sensor, a biometric sensor, or other sensing device, to facilitate related functionalities. A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of wireless/wired communication subsystem 224 depends on the communication network(s) over which recording device 200 is intended to operate. For example, in some embodiments, recording device 200 includes wireless/wired communication subsystems 224 designed to operate over a GSM network, a GPRS network, an EDGE network, a Wi-Fi or WiMax network, and/or a Bluetooth® network.

An audio subsystem 226 is coupled to a microphone 228 and a speaker 230 to facilitate voice-enabled functions, such as voice recognition, voice replication, digital recording, and telephony functions.

An I/O subsystem 240 includes a touch screen controller 242 and/or other input controller(s) 244. Touch screen controller 242 is coupled to a touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

One or more other input controllers 244 are coupled to other input/control devices 248, such as one or more buttons, rocker switches, thumb-wheel, infrared port, USB port, and/or a pointer device such as a stylus. Touch screen 246 may also be used to implement virtual or soft buttons and/or a keyboard. I/O subsystem 240 may also be configured to receive files, for instance with communication subsystem 224. The received files may be uploaded using an external media, downloaded from the internet or an intranet using network 110, or obtained as an emailed attachment or link.

Memory interface 202 is coupled to a memory 250. Memory 250 includes high-speed random access memory and/or non-volatile memory, such as one or more magnetic disk storage devices, one or more optical storage devices, and/or flash memory (e.g., NAND, NOR). Memory 250 stores an operating system 252, such as DRAWIN, RTXC, LINUX, iOS, UNIX, OS X, WINDOWS, or an embedded operating system such as VXWorkS. Operating system 252 can include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/ navigation instructions 268 to facilitate GPS and navigation-related processes and instructions; camera instructions 270 to facilitate camera-related processes and functions; and/or other software instructions 272 to facilitate other processes and functions. Memory 250 may also include multimedia conference call managing instructions 274 to facilitate conference call related processes and instructions, including audio or video calls.

In the presently described embodiment, the instructions cause processor 204 to perform one or more functions of the disclosed methods. For example, the instructions may cause camera subsystem 220 to capture an image of a speaker and cause wireless communication subsystem(s) 224 to transmit the image to server 140.

Each of the above identified instructions and software applications may correspond to a set of instructions for performing one or more functions described above. These instructions need not be implemented as separate software programs, procedures, or modules. The memory 250 may include additional instructions or fewer instructions. Furthermore, various functions of recording device 200 may be implemented in hardware and/or in software, including in one or more signal processing and/or application specific integrated circuits. Additionally, various functions of recording device 200 may be performed by server 140.

Figure 3:
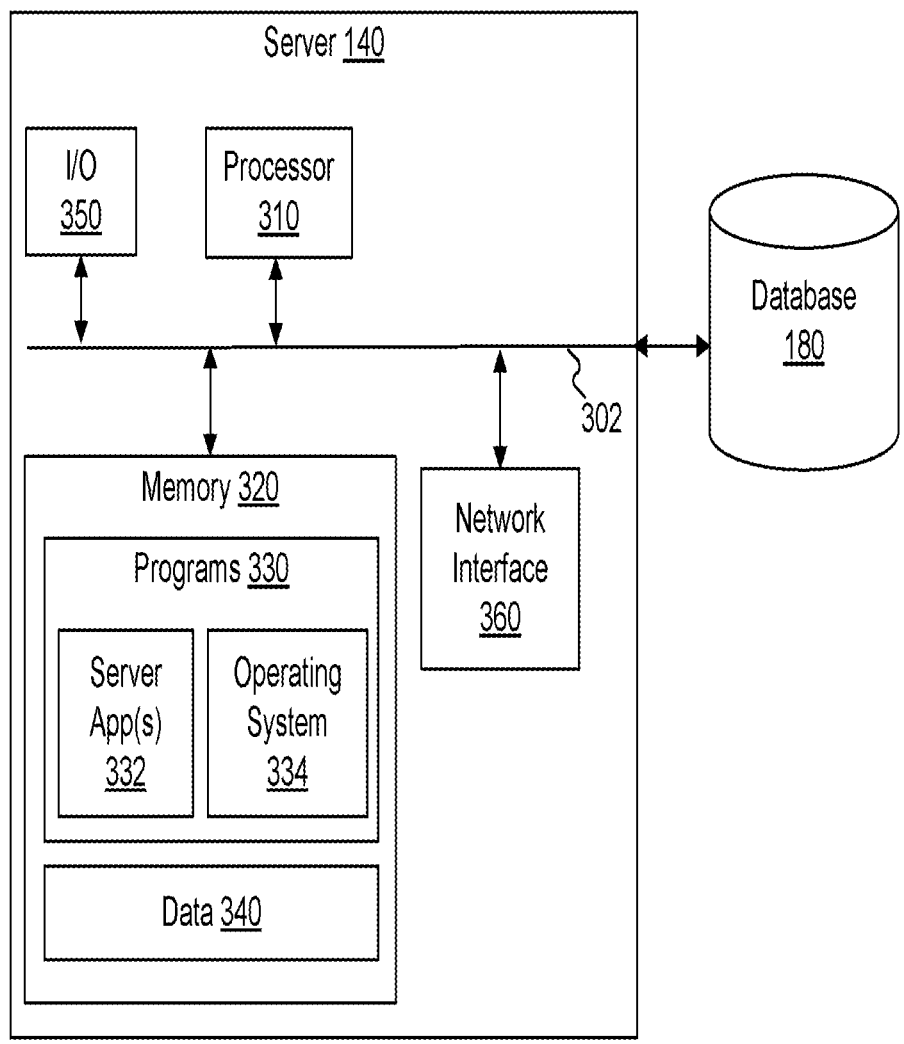
FIG. 3 is a diagram of an example automated transcription insertion server, consistent with embodiments of the present disclosure.

FIG. 3 is a diagram of an example configuration of automated transcription insertion server 140, consistent with embodiments of the present disclosure. Server 140 includes a bus 302 (or other communication mechanism) which interconnects subsystems and components for transferring information within server 140. As shown, server 140 includes one or more processors 310, input/output ("I/O") devices 350, and a network interface 360 (e.g., a modem, Ethernet card, or any other interface configured to exchange data with a network). Server 140 also includes one or more memories 320 storing programs 330 including, for example, server app(s) 332, an operating system 334, and data 340, and can communicate with external database 180 (which, for some embodiments, may be included within server 140). Server 140 may be a single server or may be configured as a distributed computer system including multiple servers, server farms, clouds, or computers that interoperate to perform one or more of the processes and functionalities associated with the disclosed embodiments.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, or the like. In some embodiments, processor 310 may include a multiple-core processor arrangement (e.g., dual, quad core, etc.) configured to provide parallel processing functionalities to allow server 140 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340 used by processor 310 (and other components) to perform certain functions related to the disclosed embodiments. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Server 140 may include one or more storage devices configured to store information. For example, server 140 may include memory 320 that includes instructions to enable processor 310 to execute one or more applications. Alternatively or additionally, the instructions, application programs, etc. may be stored in external database 180 (which can also be internal to server 140) or external storage communicatively coupled with server 140 (not shown), such as one or more database or memory accessible over network 110.

Database 180 or other external storage may be a volatile or non-volatile, magnetic, semiconductor, tape, optical, removable, non-removable, or other type of storage device or tangible or non-transitory computer-readable medium. Database 180 may include one or more memory devices that store data and instructions used to perform one or more features of the disclosed embodiments. Database 180 may also include any combination of one or more databases controlled by memory controller devices (e.g., server(s), computer(s), etc.) or software, such as document management systems, Microsoft SQL databases, SharePoint databases, Oracle™ databases, Sybase™ databases, or other relational databases.

In some embodiments, server 140 may be communicatively connected to one or more remote memory devices (e.g., remote databases (not shown)) through network 110 or a different network. The remote memory devices can be configured to store information that server 140 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 include one or more software modules configured to cause processor 310 to perform one or more functions of the disclosed embodiments. Moreover, processor 310 may execute one or more programs located remotely from one or more components of system 100. For example, server 140 may access one or more remote programs that, when executed, perform functions related to disclosed embodiments.

Server app(s) 332 causes processor 310 to perform one or more functions of the disclosed methods. For example, server app(s) 332 cause processor 310 to receive uploaded or recorded content, identify a user speaking within the content, determine a topic and chat group based on the content, and post a message to the chat group. In some embodiments, other components of system 100 may be configured to perform one or more functions of the disclosed methods.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, or other types of mobile operating systems. Accordingly, disclosed embodiments may operate and function with computer systems running any type of operating system 334. Server 140 may also include software that, when executed by a processor, provides communications with network 110 through network interface 360 and/or a direct connection to recording device 150 or chat groups 120A, 120B. In some embodiments, server 140 may also host chat groups 120A, 120B.

Server 140 may also include one or more I/O devices 350 having one or more interfaces for receiving signals or input from devices and providing signals or output to one or more devices that allow data to be received and/or transmitted by server 140. For example, server 140 may include interface components for interfacing with one or more input devices, such as one or more keyboards, mouse devices, and the like, that enable server 140 to receive input from an operator or administrator (not shown).

Figure 4:
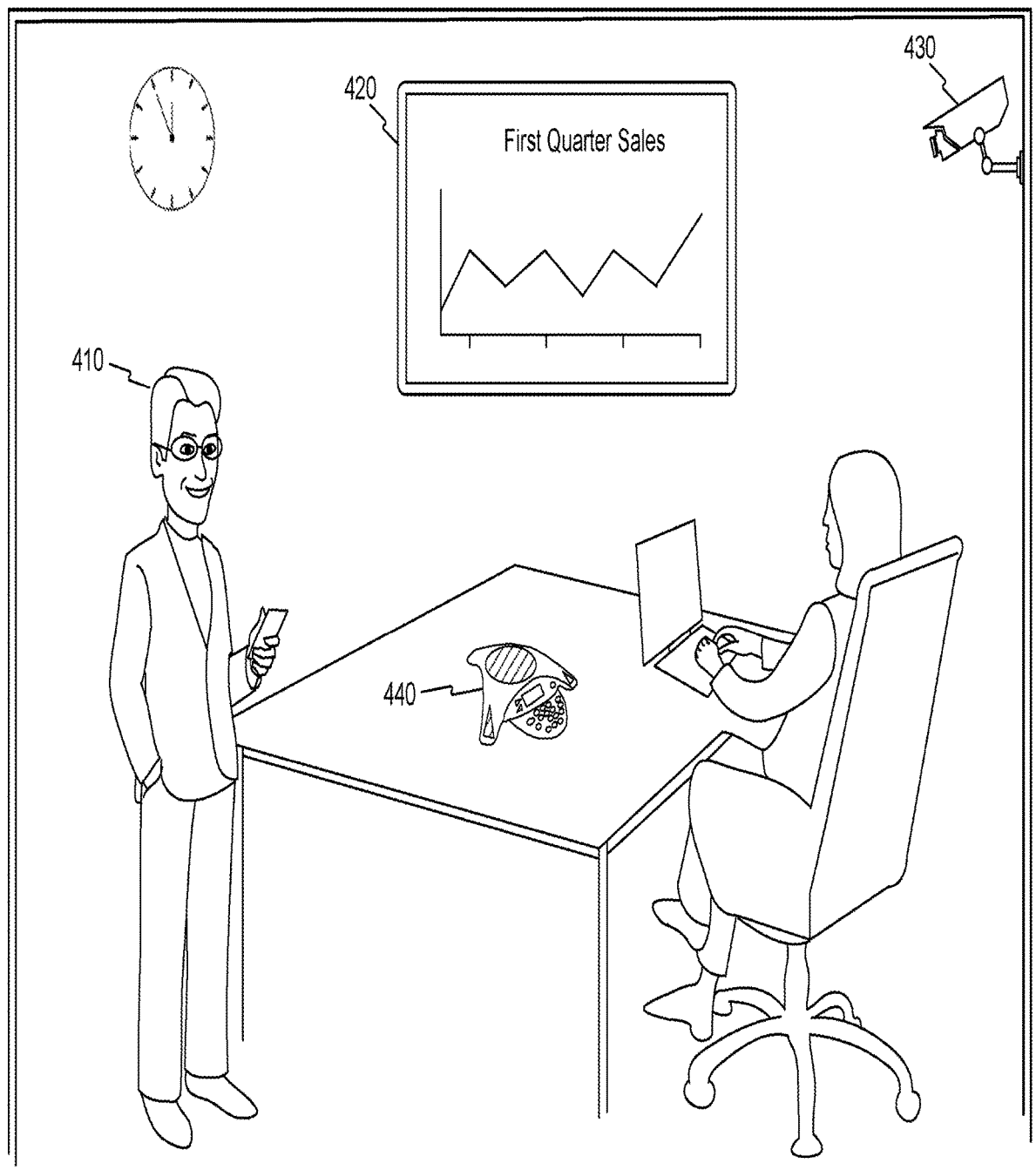
FIG. 4 is a diagram of a presentation utilizing an automated transcription insertion server, consistent with embodiments of the present disclosure.

FIG. 4 is a diagram of a presentation utilizing an automated transcription insertion server, consistent with embodiments of the present disclosure. FIG. 4 illustrates a presenter 410 delivering a presentation 420 in a conference room. The conference room contains a camera 430 and a microphone 440. Microphone 440 may be a speaker or telephone useable for teleconferences. Alternatively, microphone 440 may be worn or carried by presenter 410, such as a lapel microphone, and connected through radio waves, WiFi, or other wireless communication to a base unit. Microphone 440 may also be mounted in a conference room, such as in the conference room ceiling or walls, or on a table in the conference room. Multiple microphones may be mounted in a conference room to ensure quality recording when a speaker moves around the room. Camera 430 may be stationary, or may track a presenter by identifying sound location, for instance. Camera 430 may be integrated into camera subsystem 220 and microphone 440 may be integrated into audio subsystem 226 of recording device 200. Additionally, presentation 420 may be displayed by a device such as recording device 200. Recording device 200 may connect to the internet or a database to access presentation files and display slides using a projector (not shown).

Figure 5:
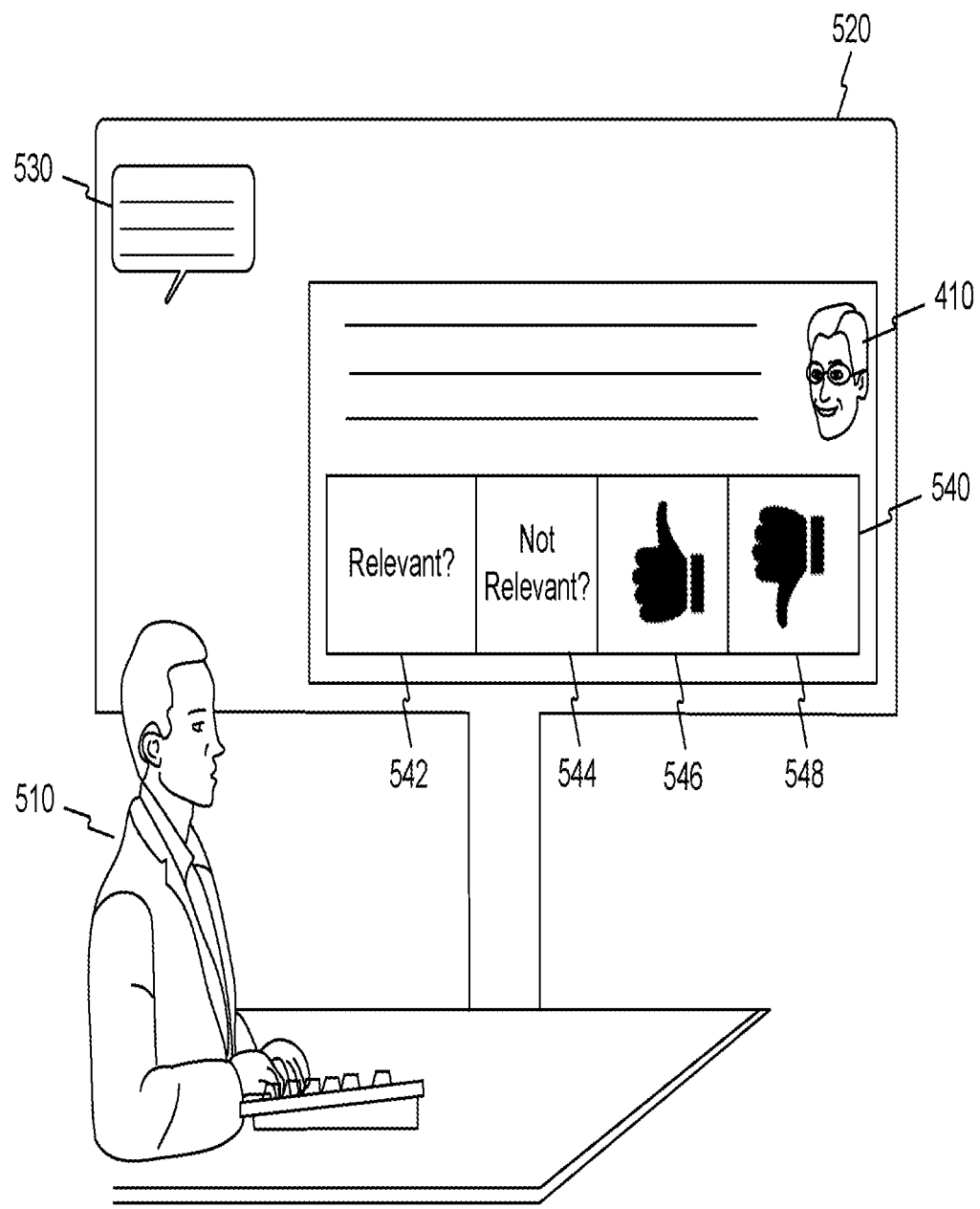
FIG. 5 is a diagram of a chat group utilizing an automated transcription insertion server, consistent with embodiments of the present disclosure.

FIG. 5 is a diagram of a chat group utilizing an automated transcription insertion server, consistent with embodiments of the present disclosure. A user 510 may access a chat group 520. Chat group 520 may be displayed on a computer monitor, as illustrated in FIG. 5, or a mobile device, tablet, and the like. Chat group 520 may include messages 530 containing text, graphics, or other media originating from user 510 as well as other users. Chat group 520 may display messages appearing to originate from presenter 410. As illustrated in FIG. 5, a message may be displayed with the face of presenter 410, an avatar of the presenter 410, the name of presenter 410, a username or handle of the presenter 410, or any other identifier associated with the presenter 410. The message may include text, indicating that presenter 410 said the words contained in the message. Further, the message may also include an image, video excerpt, audio excerpt, link to a website, link to an ongoing presentation, link to a section associated with the message in a recording of a finished presentation, and the like. The message may also include a feedback section 540. Feedback section 540 may include elements such as a relevant button 542 and a not relevant button 544, allowing user 510 to signal that the message is relevant or irrelevant to chat group 520. Feedback section 540 may also include an approval button 546 and a disapproval button 548, allowing user 510 to signal an opinion of the content of a message without indicating that the information is irrelevant. For example, a user in a chat group focused on cybersecurity may consider a CEO's presentation on relaxed cybersecurity standards as being very relevant to the chat group, but also may disapprove of the proposed relaxation. Feedback section 540 thus allows users to provide information which may be used to further refine which messages and topics are relevant to chat group 520, and to provide feedback on the substance of a message.

Figure 6:
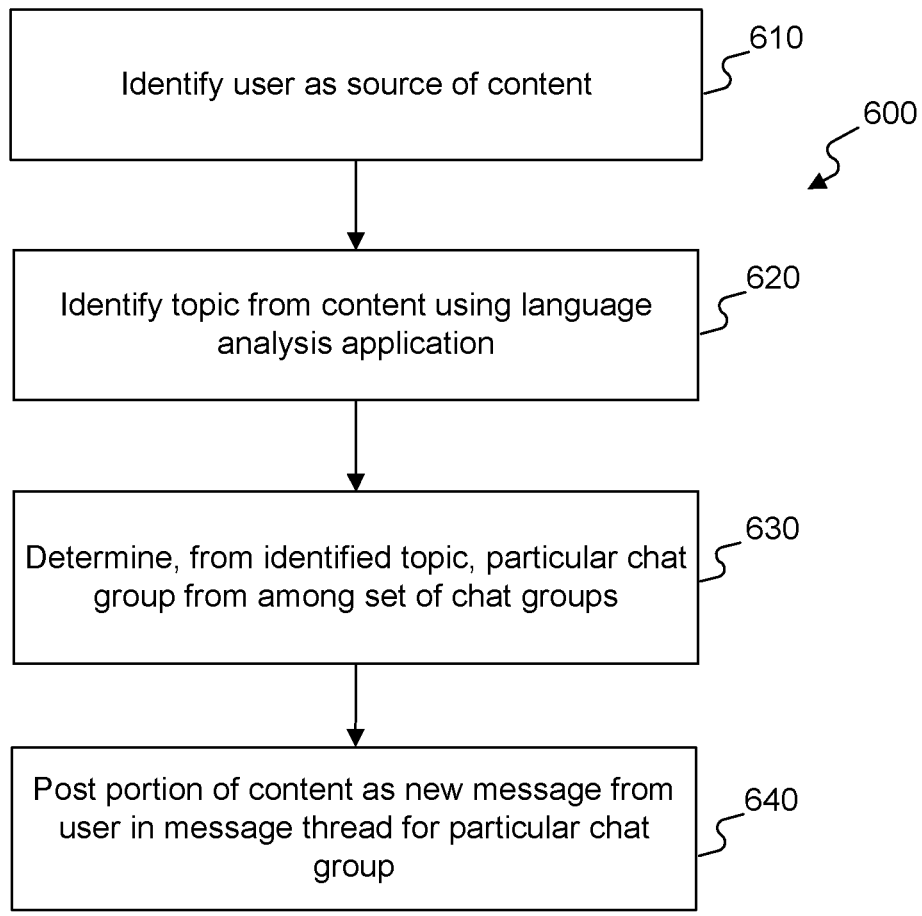
FIG. 6 is a flowchart of an example process for automated transcription insertion, consistent with embodiments of the present disclosure.

FIG. 6 is a flowchart of an example process 600 for automated transcription insertion, consistent with embodiments of the present disclosure. The steps associated with process 600 may be implemented by, for example, a system, such as system 100 including a memory and at least one processor configured to perform operations including the steps of process 600.

Step 610 includes identifying a user as a source of content. Content may be created as part of step 610. For instance, step 610 may include using a video camera and a microphone, and recording at least one of a video file with the video camera or an audio file with the microphone. The content may then include at least one of the recorded video file or the recorded audio file. In some embodiments, the content may be provided as a pre-recorded presentation or teleconference. For instance, a link (e.g. Uniform Resource Locator (URL)) to access a video recording of a webinar on a hosted on a website may be provided in conjunction with step 610.

Additionally, a file may be uploaded for use with step 610. For example, step 610 may include receiving a document, designating the received document as the content, and identifying an author of the document as the source of the content. Step 610 may also include receiving an audio or video file saved to a hard drive, or receiving a link to a location identifying where a file is saved on a database. Content created as part of step 610 may be stored in database 180 for processing.

In some embodiments, identifying the user may be performed by reference to an agenda. Step 610 may include accessing an agenda comprising planned presentation times and presenters corresponding to the presentation times; determining a current presenter by comparison of a local time with the planned presentation times; and identifying the current presenter as the user. For example, an agenda for a day of presentations may indicate that John C. is scheduled to present between 10:00 and 11:00. Step 610 may then determine that John C. is the current presenter for a presentation delivered between 10:00 and 11:00, and identify John C. as the user speaking in the presentation content. Identifying a user may further be performed by reference to a user identifier, such as a telephone number, IP address, login, email address, chat group identifier, avatar, and the like. For example, multiple users may call into a teleconference from phone numbers associated with respective users in a database. Step 610 may include determining a phone number associated with an active speaker, accessing a database to determine a name associated with the phone number, and identifying the name as the user. Similarly, if multiple users access a webinar using computers, step 610 may include determining an IP address associated with an active speaker, accessing a database to determine a name associated with the IP address, and identifying the name as the user.

In additional embodiments, step 610 may include detecting facial movement(s) of a person in view of a video camera, and identifying the person having detected facial movement as the user (for example, the user being an active speaker). In some embodiments, the facial movement is the movement of the user's lips, with an associated enunciation by the user. For instance, a presentation may be given in a room with many people who make comments or aid in the presentation. Further, the video camera may include features to direct the video camera to a source of a sound. The video camera's field of view may include a plurality of people. Step 610 may determine the speaker by detecting a face with moving lips. Step 610 may also use facial recognition technology by comparing the recorded face to a database of images of faces, as is known to those skilled in the art, to further identify the speaker. Additionally, step 610 may include voice recognition methods to identify a speaker's voice by comparison to stored data of possible speakers. If the speaker's identity is unknown, for example if the speaker is a new employee, step 610 may identify the person generically, such as "Speaker 1."

Step 620 includes identifying a topic from the content using a language analysis application. Step 620 may further include producing a transcription of the content, or providing a saved file to a transcription service via the internet and receiving a transcription from the transcription service. Further details of step 620 will be provided below.

Step 630 includes determining, from the identified topic, a particular chat group from among a set of chat groups. Each chat group in the set may have at least one message. Chat groups may include a plurality of messages recorded over time accessible in an interface. Step 630 may analyze a list of chat group-topic associations stored in database 180. The associations may be entered by an administrator, or may be determined by machine learning, as described subsequently in process 700. For example, an organization may have three chat groups, such as marketing, research and development, and finance. The marketing chat group may be associated with topics such as customer surveys and advertising. The research and development chat group may be associated with computer models and laboratory management. The finance chat group may be associated with interest rates and account balances. In this scenario, if the topic identified at step 620 is "advertising," step 630 would determine the marketing chat group as the particular chat group.

Step 640 includes posting a portion of the content as a new message from the user in a message thread for the particular chat group. The message thread may include a series of messages posted to the chat group. The new message may contain a link to or content including text, graphic, audio, or video media. For example, if the new message displays video media, the new message may also include a still shot from the video.

In some embodiments, the content may be from a presentation. For instance, a presenter of a company's quarterly update may discuss a purchase of new computers. Information technology associates may not attend the presentation, expecting it to cover topics irrelevant to information technology. Step 640 may post a message in an IT chat group with any of a text from a transcription of the portion of the content discussing the topic relevant to the chat group (e.g., computer purchases), a video excerpt showing the portion of the content corresponding to the text, an image and/or a name of the presenter, and/or a link to play a presentation corresponding to the content. The link may connect to a live stream of the ongoing presentation, such as a website hosting the presentation, or may cause the live streamed presentation to play in the message itself. If the content is a document, the new message may display an excerpt of the document, an image and/or name of the author, and a link to download or view the document. Access to the live stream or to the document may be limited depending on permissions of members of the chat group.

The new message may also include options for members of the chat group to provide feedback on the message's relevance and content. For example, the new message may include a feedback option, such as feedback section 540, allowing a chat group member to signal approval or disapproval of the new message. Process 600 may also include additional steps, such as receiving, from the chat group member, the signaled approval or disapproval; and providing feedback comprising the signaled approval or disapproval to the user, for instance, presenter 410. Process 600 may send a message to the user (e.g., a speaker, presenter, or author) based on the signaled approval or disapproval, for instance, via a chat message, text message, email message, or aural signal. For instance, whenever a chat group member selects an approve button, process 600 may play a chime sound, and when a chat group member selects a disapprove button, process 600 may play a buzzer sound. Alternatively, a message may appear on the presentation screen. In some embodiments, a cumulative feedback may be provided to the user. For example, if ten chat group members signal approval, and fifteen chat group members signal disapproval, a net disapproval of five may be relayed to the user. Cumulative feedback may be based on a rolling time interval, such as a net approval or disapproval over the preceding five minutes. Cumulative feedback may alternatively be a total approval or disapproval over the entire duration of a presentation. Additionally, in some embodiments, a message may be posted to the chat group from a member of the chat group reflecting the member's approval or disapproval. For example, if David R., a member of the chat group, selects the "approve" option, a message may be displayed in the chat group showing that David R. approves of the content. This may help draw attention of other members of the chat group to the content, helping to avoid other members ignoring the content. Similarly, indications of disapproval may be provided to members of the chat group so that other members may avoid irrelevant content, thereby reducing time lost by the group as a whole.

Figure 7:
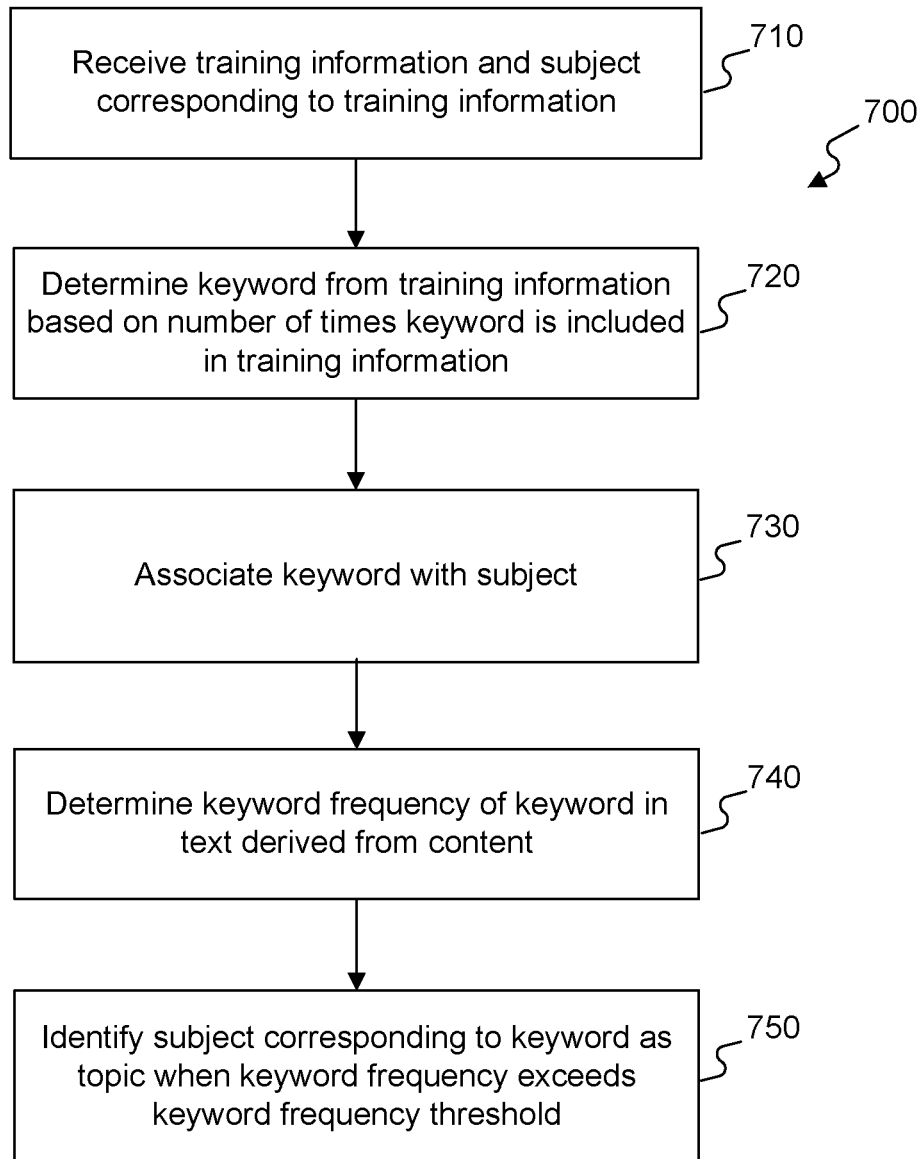
FIG. 7 is a flowchart of an example process for training automated topic identification, consistent with embodiments of the present disclosure.

FIG. 7 is a flowchart of an example process 700 for training automated topic identification, consistent with embodiments of the present disclosure. Process 700 may be used to identify topics in a document or transcript during process 600. Alternatively, steps of process 700 may occur before or after steps of process 600. Process 700 may include machine learning methods, such as training a neural network on content in order to identify topics.

Step 710 includes receiving training information and a subject corresponding to the training information. For example, many organizations use industry or organization-specific jargon, including acronyms, system names, product names, and the like, representing a unique vocabulary for different topics. Thus, at step 710, process 700 may receive training information such as employee orientation documents, manuals, specifications, technology guides, process guides, policies, instructions, or an organizational wiki site. Lectures, presentations, podcasts, webinars, and the like may also be used. The information may be uploaded, or a URL to access the information may be provided. The subject may be provided separately, for instance by a training supervisor when uploading a file. The subject may also be determined based on contents of the file, such as a title slide, title page, slide header, and the like.

Step 720 includes determining a keyword from the training information based on a number of times the keyword is included in the training information. Step 720 may identify a plurality of keywords. Step 720 may determine keywords by counting the number of times the word appears in a document or transcript, as well as the total number of words in the document or transcript. Step 720 may use fuzzy or proximity matching when counting words in a document. Words may be sliced in order to remove common word endings indicating plurality or tense, or prefixes. Additionally, words appearing on a list of high frequency words in the utilized language may be ignored as potential keywords. For example, if the document is in English, the words "the" and "a" may be eliminated as keywords despite frequently appearing in a document.

Step 730 includes associating the keyword with the subject. This association may be stored in a SQL, JSON, or dictionary structure, for example, and stored in database 180. Step 730 may be repeated for a plurality of training information items and subjects.

Step 740 includes determining a keyword frequency of the keyword in text derived from the content. Step 740 may be performed in conjunction with step 620, for instance. The text may be analyzed to determine word frequency similar to step 720. In some embodiments, the text may be compared to a list of keywords identified for all subjects, with counts developed for each keyword on the list. Step 750 includes identifying the subject corresponding to the keyword as the topic when the keyword frequency exceeds a keyword frequency threshold. The threshold may be set by a training supervisor.

In some embodiments, process 700 may also analyze a chat group among the set of chat groups to determine a keyword chat frequency representing a number of messages including the keyword, and identifying the analyzed chat group as the particular chat group when the keyword chat frequency exceeds a keyword chat frequency threshold. The analysis may be combined with determination of the particular chat group based on topic. For example, the analysis may be sufficient for the chat group to be identified as the particular chat group, allowing chat groups to change focus over time and receive messages on a topic despite not having been previously associated with the topic, without retraining. Alternatively, the analysis may be necessary for the chat group to be identified as the particular chat group, such that a chat group previously associated with a topic must also frequently discuss the topic for messages on that topic to be posted to the chat group. This could reduce the impact of incorrect training or flagging of the chat group as corresponding to a topic, while also preventing posts on obsolete topics.

In some scenarios, discussed topics may vary throughout the content. For example, a presentation may provide an update of a company's offices, including research and development, marketing, and finance. Members of the research and development office may not be interested in updates regarding marketing. Additionally, members of the marketing office may not be permitted to see information from the finance office due to confidentiality concerns, policies, laws, and the like. Therefore, in some embodiments, excerpts of the content may be demarcated by topic, with messages posted to chat groups containing only the excerpted material. This further increases the relevance of the message and the likelihood that members of the chat group will review the information, rather than ignoring it due to a presumption that the information is irrelevant.

Figure 8:
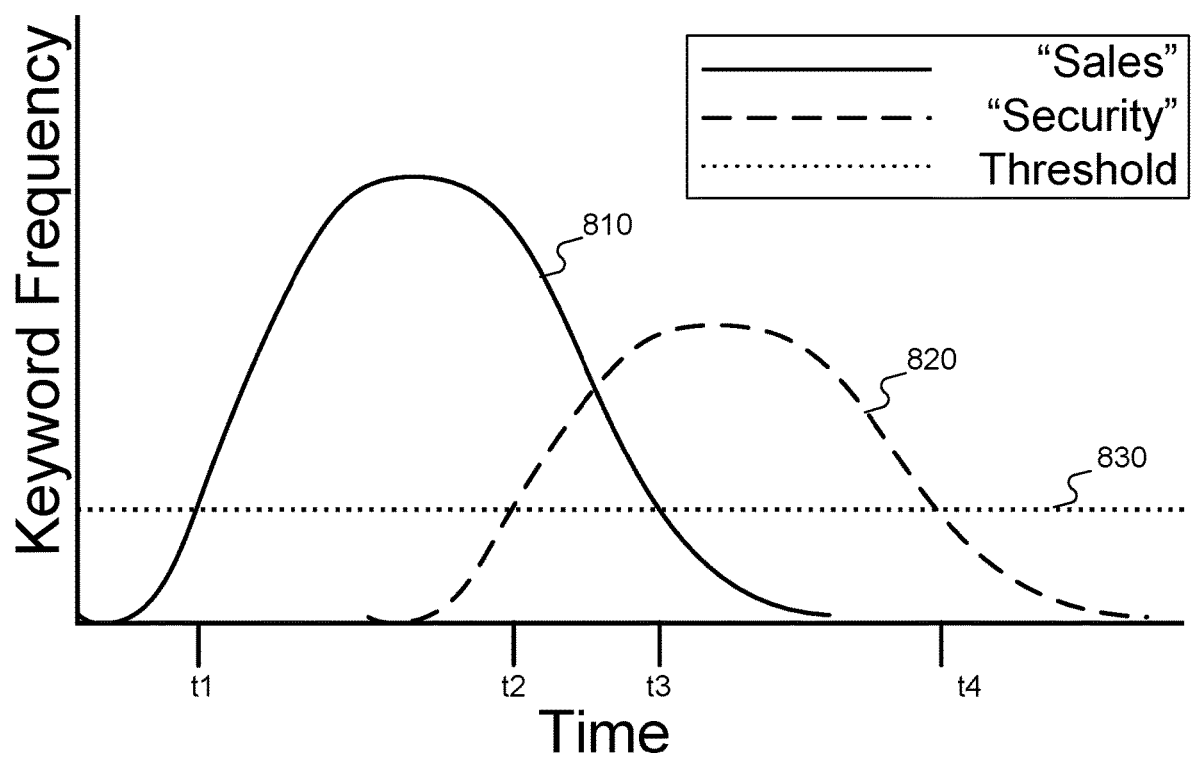
FIG. 8 is an example keyword frequency analysis for determining relevant topics and excerpts, consistent with embodiments of the present disclosure.

FIG. 8 is an example keyword frequency analysis for determining relevant topics and excerpts, consistent with embodiments of the present disclosure. An analysis similar to that illustrated in FIG. 8 may be performed in conjunction with process 700, for example. FIG. 8 illustrates a record of keyword frequency over time for a plurality of keywords. The keyword frequency may be the number of times the keyword was stated in the previous minute or another time frame, for example. Additionally, the keyword frequency may be based on a window, such as 300 words before and after an instance of the keyword. Further, the keyword frequency may change as a function of time, as illustrated in FIG. 8, or may change as a function of page number, slide number, or other demarcations in the content.

"Sales" line 810 indicates the frequency of the word "sales" in a presentation over time, and "security" line 820 indicates the frequency of the word "security" over time. For example, a presentation may cover topics of sales and security. The topics may overlap, such as during a discussion on transaction security of a sales website. The topics may also exist independently, such as a discussion on email security preceding a discussion on quarterly sales. Threshold line 830 illustrates a threshold keyword frequency required to identify a topic as being present. For example, a presenter may mention the word "security" at the beginning of a presentation, stating the security will be discussed later. Although the word "security" is stated, the topic may not be addressed at sufficient detail to be of interest to a chat group. A threshold may be established by an administrator or by training and pattern recognition over time. Further, different keywords may have different thresholds. For example, a chief of security operations may desire to know every time the word security is mentioned during a presentation, resulting in a low threshold, while a chief of marketing may only be interested in in-depth discussion of sales. In some embodiments, each keyword may be associated with a keyword weight. Respective products of keyword frequencies and keyword weights may be calculated, and products may be summed across a keyword cluster, including a plurality of keywords associated with a topic, and compared to a cluster threshold. If the cluster threshold is met, messages may be posted to a chat group. For example, a cluster may contain keywords such as "security" having a low weight and keywords such as "dual factor authentication" having a greater weight. A high frequency of the keyword "security" combined with a lower frequency of the keyword "dual factor authentication" may indicate an in-depth conversation is occurring on security topics. The product of the frequency of the keyword "security" and the weight of the keyword "security" may be calculated, and added to the product of the frequency of the keyword "dual factor authentication" and the weight of the keyword "dual factor authentication." If the sum of the two products is greater than a threshold, a detailed conversation on security may be occurring based on the keyword cluster for security topics, triggering posts to a security chat group.

As illustrated in FIG. 8, at time t1, "sales" line 810 first exceeds threshold line 830. This may indicate that a presenter is focusing on sales. The keyword frequency rises and falls as the conversation progresses. At time t2, "security" line 820 exceeds threshold line 830, indicating that the presenter is also focusing on security. At time t3, "sales" line 810 falls beneath threshold line 830, indicating that the presentation has moved on to a different topic. For instance, at time t3, "security" line 820 remains above threshold 830, indicating that the presentation no longer focuses on sales and now focuses on security. At time t4, "security" line 820 falls below threshold 830, indicating that the presentation no longer focuses on security.

Points at which keyword frequency crosses a threshold may demarcate a beginning and an end of an excerpt. In the example illustrated in FIG. 8, an excerpt regarding sales may run from time t1 to time t3, and an excerpt regarding security may run from time t2 to time t4. A new message posted in a chat group focusing on a topic identified in a presentation may contain the identified excerpt. Thus, a marketing chat group would receive a new message containing text, audio, and/or video including the excerpt from time t1 to time t3, and a security chat group would receive a new message containing an excerpt from time t2 to time t4. As shown in FIG. 8, excerpts may overlap. In some embodiments, chat group permissions may be analyzed before posting messages to a chat group, and a message may not be posted to a chat group lacking necessary permissions even though a topic corresponding to a chat group is present. For example, if a marketing chat group is not allowed to hear discussions on security, the marketing chat group would stop receiving messages at time t2, or, depending on sensitivity, at the first mention of the word "security," even though the word "sales" has a keyword frequency over threshold 830 at time t2.

Further, excerpts may be posted to a chat group at intervals during a period of time when the corresponding keyword frequency is above a threshold. For example, minute-long excerpts may be posted to a sales chat group every minute, beginning at time t1 and ending at time t3. The interval durations may be pre-set, or may vary based on feedback received from members of a chat group.

In some embodiments, a keyword may have a frequency beneath a threshold, but the content may include important information regarding the topic corresponding to the keyword. For example, a presentation on a budget may mention "security" infrequently, but members of a security chat group may consider the entire budget conversation relevant. Therefore, in some embodiments, chat group members may provide feedback which causes new messages to be posted in the chat group despite the keyword frequency of an excerpt being beneath a threshold. Alternatively, a keyword may appear many times in content, but members of a chat group may not consider the content relevant. For example, members of a cyber security chat group may not be interested in physical security topics, and wish to ignore a presentation discussing physical security despite a high keyword frequency for the keyword "security."

Figure 9:
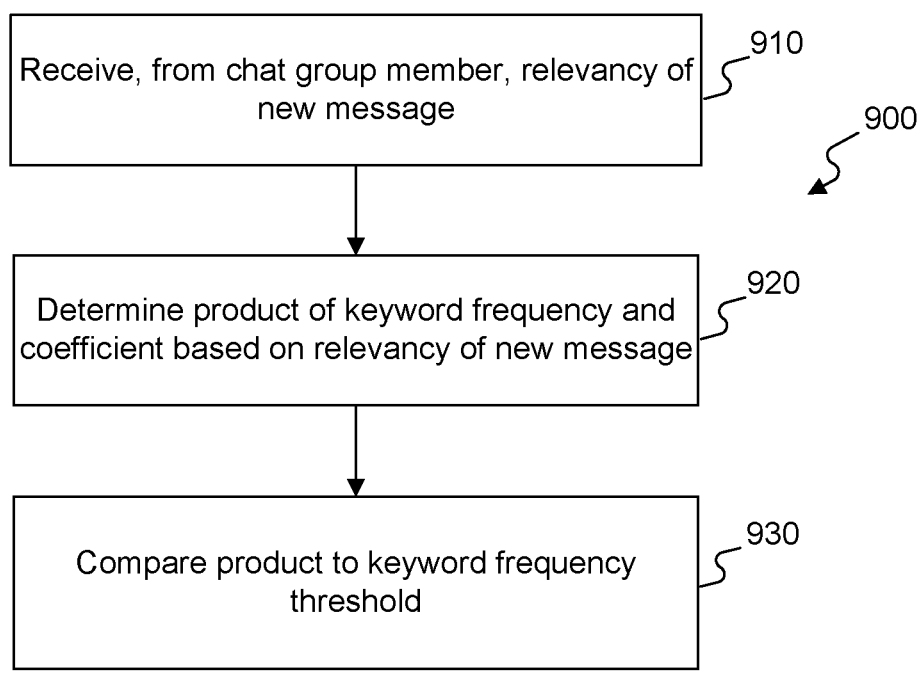
FIG. 9 is a flowchart of an example process for receiving feedback from a member of a chat group, consistent with embodiments of the present disclosure.

FIG. 9 is a flowchart of an example process 900 for receiving feedback from a member of a chat group, consistent with example embodiments of the present disclosure. A new message posted to a chat group may include a feedback option allowing a chat group member to signal a relevancy of the new message, such as an option to indicate that the message is relevant or not relevant. Step 910 includes receiving, from the chat group member, the relevancy of the new message. The relevancy may be transmitted as a new message within a chat group, a text message, email, and the like, or as a computer-readable electronic communication, for instance using feedback section 540.

Step 920 includes determining a product of the keyword frequency and a coefficient based on the relevancy of the new message. For example, a determined keyword frequency, measured by counting a number of times the keyword appears in a time period, may be multiplied by 1.1 for every time a chat group user indicates that the message is relevant. In some embodiments, a number may be added to the keyword frequency. Additionally, keyword frequency may be multiplied by 0.9 for every time a chat group user indicates that the message is not relevant, or a number subtracted from the keyword frequency. Relevancy indications may offset one another, such that when one member of the chat group indicates a message is relevant and another member indicates the message is irrelevant, the coefficient remains 1. Further, the coefficient may be based on a relevancy indication rate. For example, a discussion on budgets may focus on cybersecurity budgets, mentioning the word "security" once at the beginning of the conversation but speaking on details of a security budget for a longer duration. Members of a cybersecurity chat group may indicate that the discussion is relevant towards the beginning of the discussion, ensuring that excerpts are posted to the chat group despite the keyword frequency being low. Over time, the discussion may transition to physical security, and the rate of indications that the discussion is relevant may decrease as chat group members do not send relevancy indicators or send indicators that the content is irrelevant. The coefficient may then decrease as well, and be based, for instance, on a number of relevancy indications received in the preceding minute. The period for which the relevancy rate is determined may be based on the excerpt interval at which messages are posted to the chat group. Step 930 includes comparing the product to the keyword frequency threshold. In this manner, members of a chat group may improve the relevancy of messages posted to the chat group in real time, while also decreasing the prevalence of irrelevant messages.

Additionally, relevancy coefficients may be stored to improve future posting, thus training a system to make more precise posts. For example, a keyword may be associated with a low coefficient during a presentation. The keyword frequency of a later presentation may be combined with a coefficient determined during an earlier presentation. In this way, chat group users may train a system to post messages on more relevant topics.

Processes 700 and 900 may be further illustrated by reference to an example. An organization may contain an office focusing on nuclear power production. During step 710, a training supervisor may provide manuals connected to the subject "nuclear power production." Step 720 may analyze the manuals and identify "reactor" as a keyword based on the number of times the word "reactor" appears in the manuals. Step 730 may associate the keyword "reactor" and the subject "nuclear power production." A CEO of the organization may later give a presentation on the organization's goals, and speak about new reactor development. A transcript of the presentation may be created, and step 740 may determine the frequency of the keyword "reactor" in the presentation. Step 750 may then identify the subject corresponding to the keyword "reactor," namely "nuclear power production," as the topic of the presentation because "reactor" is mentioned enough times in the presentation to exceed the keyword frequency threshold. Excerpts of the presentation may then be posted every minute to an operations chat group associated with the topic of nuclear power production. Additionally, the presentation may be posted to a chat group associated with marketing because chat messages in the marketing chat group frequently mention the keyword "reactor," despite the marketing chat group not having a stored association with the topic of nuclear power production. As the CEO's presentation progresses, members of the marketing chat group may realize that the presentation focuses on reactor safety requirements, and, at step 910, indications may be received that the presentation is not relevant. The keyword frequency may be decreased based on the indications that the presentation is not relevant at step 920, and the market chat group would no longer receive new messages from the CEO's presentation due to the comparison at step 930. However, members of the operations chat group may indicate that the presentation is highly relevant at step 910, causing more messages to be posted to the chat group even after the CEO reduces or stops mentioning the word "reactor" in the presentation.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A system comprising:
   a memory; and
   at least one processor configured to perform operations comprising:
      receiving training information and a subject corresponding to the training information;
      determining a keyword from the training information based on a number of times the keyword is included in the training information;
      associating the keyword with the subject;
      determining a keyword frequency representing a number of times the keyword occurs in a window of a media, wherein the window of the media has a predetermined time length;
      identifying the subject as a topic of the media when the keyword frequency exceeds a keyword frequency threshold;
      determining an application that focuses on the topic, the application allowing users to post messages; and
      posting a portion of the media as a new message in the application, wherein the portion of the media comprises information in the window.

2. The system of claim 1, wherein the media comprises a video, and wherein the system further comprises:
   a video camera; and
   a microphone; and
   the operations further comprise:
      determining a source of a sound;
      directing the video camera to the source of the sound;
      identifying a face of a person who is the source of the sound by comparing the face to a database of images of faces; and
      indicating the identified person as the source of the media in the new message.

3. The system of claim 1, wherein the media comprises audio, and the operations further comprise:
   comparing a voice of a speaker in the media to a database of voices;
   identifying a speaker based on the comparison; and
   indicating the identified speaker as a source of the media in the new message.

4. The system of claim 1, wherein the operations further comprise:
   posting a link to a live stream of an ongoing presentation in the application.

5. The system of claim 1, wherein the operations further comprise:
   identifying the subject corresponding to training information based on a title contained in the training information.

6. The system of claim 1, wherein determining the keyword from the training information based on the number of times the keyword is included in the training information further comprises:
   slicing words to remove at least one of prefixes or suffixes; and
   identifying a sliced word as the keyword when the sliced word is not contained in a list of high frequency words for a language of the media.

7. The system of claim 1, wherein the operations further comprise:
   determining a keyword frequency for each of a plurality of keywords;
   identifying a plurality of subjects corresponding to keywords having keyword frequencies above a keyword frequency threshold;
   identifying each of the plurality of subjects as a plurality of topics of the media;
   determining, for each of the plurality of topics, an application;
   posting the portion of the media in each of the applications when all users having access to the application have permission to view media for each of the plurality of topics.

8. The system of claim 1, wherein the operations further comprise:
   receiving indications of relevancy of the posted portion of the media; and
   posting the portion of the media as the new message in the application when a product of the keyword frequency and a coefficient based on a relevancy indication rate exceeds the keyword frequency threshold.

9. The system of claim 8, wherein the coefficient is stored and re-used for another media.

10. The system of claim 1, wherein the portion of the media is posted at a posting frequency corresponding to a length of the portion of the media.

11. A non-transitory computer-readable medium storing instructions that, when executed by one or more processors, cause the one or more processors to perform operations comprising
   receiving training information and a subject corresponding to the training information;
   determining a keyword from the training information based on a number of times the keyword is included in the training information;
   associating the keyword with the subject;
   determining a keyword frequency representing a number of times the keyword occurs in a window of a media, wherein the window of the media has a predetermined time length;
   identifying the subject as a topic of the media when the keyword frequency exceeds a keyword frequency threshold;
   determining an application that focuses on the topic, the application allowing users to post messages; and
   posting a portion of the media as a new message in the application, wherein the portion of the media comprises information in the window.

12. The medium of claim 11, wherein the media comprises a video, and wherein the operations further comprise:
   determining a source of a sound;
   directing a video camera to the source of the sound;
   identifying a face of a person who is the source of the sound by comparing the face to a database of images of faces; and
   indicating the identified person as the source of the media in the new message.

13. The medium of claim 11, wherein the media comprises audio, and the operations further comprise:
   comparing a voice of a speaker in the media to a database of voices;
   identifying a speaker based on the comparison; and
   indicating the identified speaker as a source of the media in the new message.

14. The medium of claim 11, wherein the operations further comprise:
   posting a link to a live stream of an ongoing presentation in the application.

15. The medium of claim 11, wherein the operations further comprise:
   identifying the subject corresponding to training information based on a title contained in the training information.

16. The medium of claim 11, wherein determining the keyword from the training information based on the number of times the keyword is included in the training information further comprises:
   slicing words to remove at least one of prefixes or suffixes; and
   identifying a sliced word as the keyword when the sliced word is not contained in a list of high frequency words for a language of the media.

17. The medium of claim 11, wherein the operations further comprise:
   determining a keyword frequency for each of a plurality of keywords;
   identifying a plurality of subjects corresponding to keywords having keyword frequencies above a keyword frequency threshold;
   identifying each of the plurality of subjects as a plurality of topics of the media;
   determining, for each of the plurality of topics, an application;
   posting the portion of the media in each of the applications when all users having access to the application have permission to view media for each of the plurality of topics.

18. The medium of claim 11, wherein the operations further comprise:
   receiving indications of relevancy of the posted portion of the media; and
   posting the portion of the media as the new message in the application when a product of the keyword frequency and a coefficient based on a relevancy indication rate exceeds the keyword frequency threshold.

19. The medium of claim 18, wherein the coefficient is stored and re-used for another media.

20. The medium of claim 11, wherein the portion of the media is posted at a posting frequency corresponding to a length of the portion of the media.

\* \* \* \* \*